United States Patent [19]

Schlueter

[11] 4,125,988

[45] Nov. 21, 1978

[54] COTTON HARVESTER

[75] Inventor: Francis E. Schlueter, Des Moines, Iowa

[73] Assignee: Deere & Company, Moline, Ill.

[21] Appl. No.: 796,268

[22] Filed: May 12, 1977

[51] Int. Cl.² ............................................. A01D 46/08
[52] U.S. Cl. ............................................ 56/30; 56/36
[58] Field of Search ................ 56/15.9, 28, 30, 33–49, 56/126–130, 328 R, 330

[56] References Cited

U.S. PATENT DOCUMENTS

| 685,111 | 10/1901 | Dannelly | 56/30 |
|---|---|---|---|
| 2,025,514 | 12/1935 | Johnston | 56/36 |
| 2,489,963 | 11/1949 | Henley | 56/30 |
| 2,665,534 | 1/1954 | Rust | 56/36 |
| 3,035,387 | 5/1962 | Berill | 56/28 |
| 3,613,339 | 10/1971 | Riggs | 56/35 X |
| 3,631,660 | 1/1972 | Rickel | 56/15.9 |
| 3,716,976 | 2/1973 | Copley et al. | 56/106 |

Primary Examiner—Russell R. Kinsey

[57] ABSTRACT

A pair of transversely aligned upright columns of bristles are mounted on the forward gatherers of a cotton harvester. The bristles extend horizontally with the free ends of the bristles in the columns being closely adjacent to one another thereby closing the forward end of the passage through which the cotton plants pass. The harvesting mechanism of the harvester will often throw cotton bolls out of the forward end of the plant passage and with the bristles arranged as proposed the cotton will be prevented from leaving the passage and/or will be impinged on the ends of the bristles. Cotton plants moving against the bristles will bend or deform them and will comb any cotton that is retained on the bristles back into the area of the harvesting equipment.

4 Claims, 3 Drawing Figures

COTTON HARVESTER

BACKGROUND OF THE INVENTION

In crop harvesters, particularly of the type that is known as cotton strippers, there is a vigorous action within the harvesting housing when the cotton bolls are detached from the plants. The cotton plants move through a plant passage in the housing. Often the action is so vigorous that cotton bolls are thrown out or discharged out of the front end of the passage. In order to prevent loss of cotton in this manner it has been conventional in the past to provide chains that depend from their upper ends connected to the housing which hang in the mouth of the passage. The lower or free ends are, of course, free to move in all directions. This has met with some success because as cotton bolls are thrown forwardly by the harvesting mechanism they may strike some of the depending chains and fall back into the harvesting mechanism. However, such an arrangement has not met with great success since the chains will tend to deform in accordance to the plants that are moving throughh the passage. Also, in some instances the chains will knock off loose cotton bolls before they are permitted to enter into the passage thereby causing them to be lost onto the ground.

SUMMARY OF THE INVENTION

With the above in mind it is a primary object of the present invention to provide a new and different means for closing the forward end or the mouth of the plant passage through which plants move into the harvesting mechanism of a harvester. More specifically it is the object of the present invention to provide columns of bristles disposed and mounted on the housing structure on opposite sides of the passage. The bristles extend inwardly and rearwardly toward the center of the passage so that the ends of the bristles substantially touch. This provides for a vertical wall of horizontal bristles that close the mouth or forward end of the passage. As cotton or other type plants move into the passage they contact the sides of the bristles and since those bristles are inclined in the direction of movement of the cotton plants with respect to the harvester there will be no aggressive contact between the bristles and the plants. However, as the plants move into the passage and out of contact with the bristles the cotton bolls will be trapped within the housing structure. Cotton bolls that are thrown by the harvesting mechanism will contact the back or rear side of the bristles or the ends of the bristles. If they are impinged on the ends of the bristles, additional plants moving against the bristles will tend to comb the cotton bolls from the plants. Also, the bristles will deform generally to the shape of the plants and of course will keep the passage closed except for the area in which the plants are moving. To a degree, therefore, the forward end or the mouth of the passage is closed either by the bristles or partially by the bristles and the plants.

It is a further object of the present invention to provide a vertical wall of bristles made up of vertically extending bristles that are held at their upper ends and depend into the upper portion of the plant passage. Generally the vertical bristles are substantially vertically aligned with the upper ends of the bristle columns mounted on the sides of the passage. This further assures that the entire front passage is closed at all times.

It is further proposed to mount the two vertical columns of bristles on the gathering structure of the cotton harvester. As is conventional each gathering structure is pivotally mounted on a horizontal axis so that it can rise and fall in accordance with the ground surface that the cotton harvester moves over. Also with the gatherers there is provided a floor grill that extends rearwardly into and generally under the passage. The aforesaid column of bristles has its lower end beginning substantially adjacent the grill structure. Thus, the bristles close the forward end of the passage and the grill structure at the lower end, which is fixed to the gathering structure, reduces serious loss of cotton through the bottom side of the passage.

DESCRIPTION OF THE PREFERRED EMBODIMENT

Figure 1:
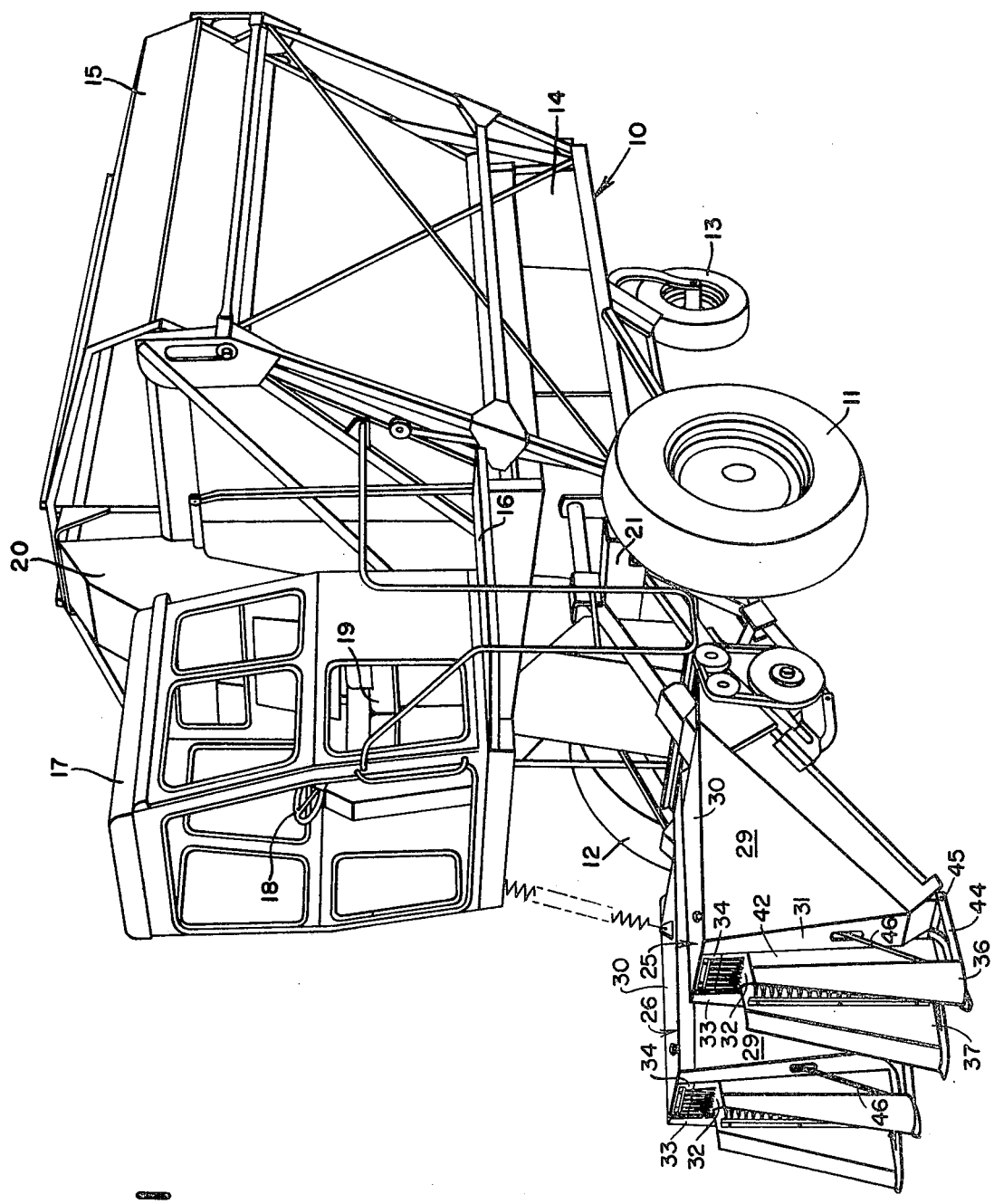
FIG. 1 is a front and side prospective view of the entire harvesting unit.

A cotton harvester using the improvement of the present invention may be of the type shown and described in U.S. Pat. No. 3,716,976 that issued to R. D. Copley and F. E. Schlueter on Feb. 20, 1973. Referring to FIG. 1, the cotton harvester includes a basic tractor or frame 10 having front traction wheels 11, 12 and a rear steerable wheel 13. The tractor 10 has a main power source or engine 14 and carries a large material or cottonreceiving basket 15 thereon. Forward of the basket 15 is an operator's platform 16 that includes a cab 17, steering mechanism 18 and a seat 19. The platform 16 has a rear opening therein and the cab 17 is spaced forwardly of the front wall of the basket 15 to permit passage of a large material conveying duct 20 that discharges into the basket 15. The lower end of the duct 20 contains the material treating unit, which in this particular instance operates to separate ripe and green bolls and heavier trash that is harvested with the ripe and green bolls. While this type of crop treating system is shown, it should be recognized that other types of crop treating systems or mechanisms could be used such as, for example, a driven type of boll cleaner and trash separator. Extending between the front traction wheels 11, 12 is a main U-shaped frame structure that includes a horizontal section 21 positioned just to the rear of the lower end of the duct 20, and a pair of depending sections, not shown, having their lower ends connected to the respective wheels 11, 12. A pair of row units 25, 26 are supported on the frame forwardly of the duct 20. The row units 25, 26 are each composed of an upright housing structure that encloses a harvesting mechanism, not shown, that removes cotton bolls from the plants as the row units 25, 26 move over the rows. Each housing structure is composed of opposed side walls, such as is shown at 29, an overhead horizontal panel 30 and front upright wall structure 31 that defines an upright forwardly opening plant passage 32. The wall structure 31 is composed of a pair of upright transversely extending panels 33 on opposite sides of the respective passage 32, and an overhead transversely extending panel 34 that defines the upper extremity of the plant passage and connects to the respective upright panels 33.

The row units 25, 26 and their respective housing structures also include for each unit a pair of forwardly extending crop gathering units 36, 37. The respective gathering structures are composed of upright panel sections including curved sections 38, 39, inwardly and rearwardly converging sections 40, 41 and fore-and-aft extending upright sections 42, 43 tht extend rearwardly and define the outer limits of the passage 32. The gathering units 36, 37 have lower horizontally disposed frameworks such as are shown at 44 that are pivotally connected at 45 to swing vertically. The forward ends of the gatherers 36, 37 rest on the ground and shoes, not shown, are provided that sense the contour of the ground and relays, by means of rods 46, the contour characteristics to a valve mechanism, also not shown, which controls the vertical adjustment of the respective row units. Details of the shoes, the controls and the means for raising and lowering the respective row units are shown and described in the aforementioned U.S. Pat. No. 3,716,976. Power for the row units is received from the engine through power shafts 47, 48 and a belt drive 49. Details of the drive are also shown in the aforementioned patent.

Fixed to the lower ends of the gathering shields 36, 37 are horizontal lips or plates 50, 51 which extend around the inner edges of the respective gatherers 36, 37 and under the housing. Fixed to the lips or plates 50, 51 are additional narrow plate structures 52, 53 that also extend and form grill work at the base of the respective housings.

Figure 3:
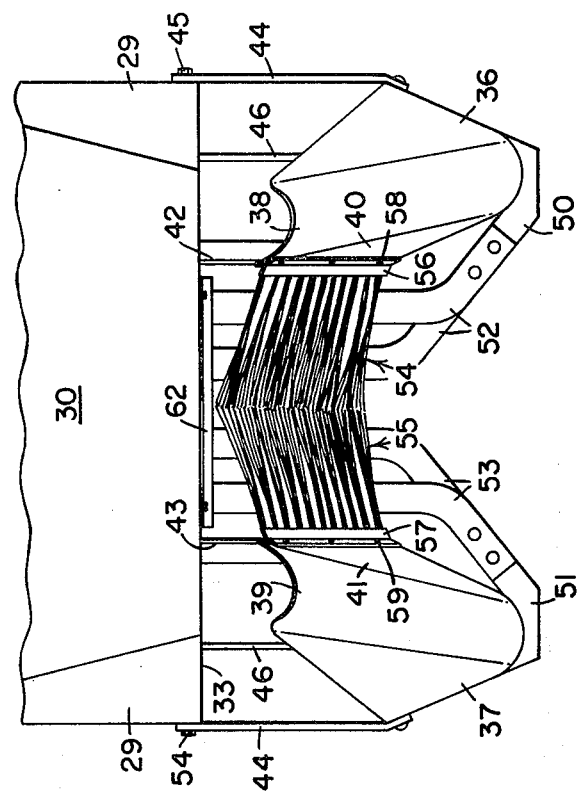
FIG. 3 is a plan view of the forward portion of the row unit.
Figure 2:
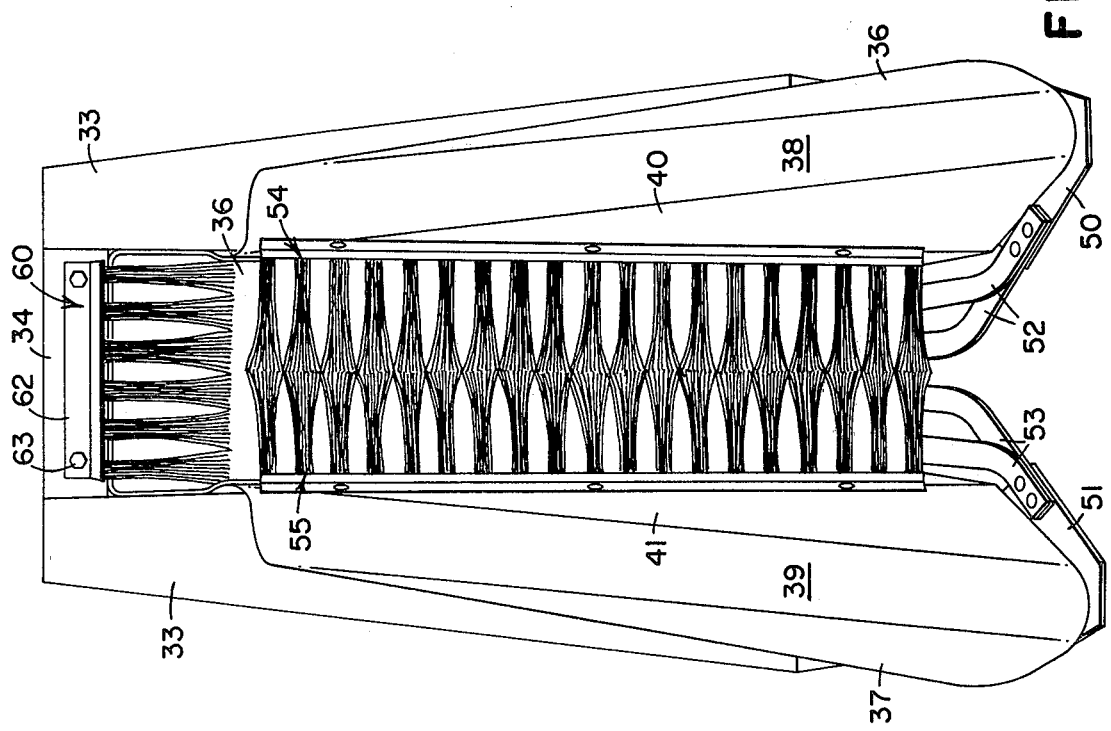
FIG. 2 is a front prospective view of one of the cotton harvesting row units.

Vertical brushes in the form of a pair of upright columns of bristles 54, 55 are fixed to the rearwardly converging panel sections 40, 41 at their juncture with the vertical sections 42, 43. The brushes or columns 54, 55 have their bristles extending generally horizontally from the back side of upright mounting plates 56, 57 that are bolted at 58, 59 to the respective panels. As may be seen from viewing FIGS. 1 and 2, the height of the columns or brushes are substantially the same height as the gatherers 36, 37. Also from viewing FIG. 3, it is clear that the bristles extend inwardly and rearwardly so that the free ends of the respective brushes 54, 55 are closely adjacent to one another and the expanse of the brushes are such that they serve to close the mouth of the plant passage 32. Viewing FIG. 2, there is some space between the uppermost edges of the brushes 54, 55 and the cross panel 34. Filling this space, is a third brush indicated in its entirety by the reference numeral 60. The bristles of this brush extend substantially the full expanse of the plant passage 32. They are mounted on the cross panel 34 by means of a bracket 62 that is bolted at 63 to the panel. The bristles extend vertically from the bracket 62 to free ends closely adjacent to the upper ends of the brushes 54, 55.

In operation the improvement operates in the following manner. As the harvester moves over the field, cotton plants will move into the respective row units 25, 26 and against the bristles of the brush elements 54, 55 and 60. Since the bristles of the brushes 54, 55 converge as they extend inwardly and rearwardly, the bristles will deform generally to the outermost contour of the plant. Thus when a plant is passing between the brushes, the passage 32 is closed at its mouth or forward end either by the bristles of the brushes 54, 55 or the bristles and the plant itself as the latter deforms the bristles. The bristles of the uppermost brush 60 obviously deform but since it contacts only the upper portion of the plant it is clear that deformation thereof is held to a minimum. Once the plants move by the brushes, they will enter the area of the harvesting mechanism and the cotton bolls will be detached from the plant in a rather vigorous manner. The cotton bolls will often be thrown forwardly against the brushes either to impinge against the sides of the bristles or against the ends of the bristles. In either case, they will be blocked from leaving the interior of the housing. If the cotton impinges on the ends of the bristles, additional plants moving against the bristles will tend to comb the cotton off of the bristle ends.

I claim:

1. In a cotton harvester unit including an upright housing structure having a forwardly opening plant receiving passage and cotton harvesting mechanism in the housing for separating cotton from plants as they move through the passage, the improvement comprising: a pair of forward crop gathering structure on opposite sides of the passage and supported on the housing structure, said gathering structures having opposed and forwardly diverging walls on opposite sides of and projecting forwardly of the passage formed by the housing; transersely aligned upright columns of bristles mounted on the respective gathering structures and extending substantially the full height of the gatherer structures, the bristles of said columns being generally horizontal and converging inwardly and rearwardly to free ends that are closely adjacent to one another so as to close the mouth of said passage.

2. The invention described in claim 1 in which the uppermost bristles of the columns are vertically offset from the portion of the housing structure at the top of the passage and further characterized by a wall of vertically extending bristles fixed to and depending from said portion of the housing to free ends adjacent said uppermost bristles.

3. In a cotton harvester unit including an upright housing structure having a forwardly opening plant receiving passage and cotton harvesting mechanism in the housing for separating cotton from plants as they move through the passage, the improvement comprising: a pair of transversely aligned upright columns of bristles mounted on the housing structure on opposite sides of the passage, the bristles of said columns being generally horizontal and converging inwardly and rearwardly to free ends that are closely adjacent to one another so as to close the mouth of said plant receiving passage.

4. In a harvester unit including an upright housing structure having a forwardly opening plant receiving passage and harvesting mechanism in the housing for separating crop material from plants as they move through the passage, the improvement comprising: a pair of forward crop gathering structure on opposite sides of the passage and supported on the housing structure, said gathering structures having oppposed and forwardly diverging walls on opposite sides of and projecting forwardly of the passage formed by the housing; transversely aligned upright columns of bristles mounted on the respective gathering structures and extending substantially the full height of the gatherer structures, the bristles of said columns being generally horizontal and extending inwardly to free ends that are closely adjacent to one another so as to close the mouth of said passage.

* * * * *

Disclaimer

4,125,988.—*Francis E. Schlueter*, Des Moines, Iowa. COTTON HARVESTER. Patent dated Nov. 21, 1978. Disclaimer filed Oct. 17, 1980, by the assignee, *Deere & Company*.

Hereby enters this disclaimer to all the claims, claims 1–4 of said patent.

[*Official Gazette January 6, 1981.*]